(12) United States Patent
Shirai et al.

(10) Patent No.: US 6,242,904 B1
(45) Date of Patent: Jun. 5, 2001

(54) ROTATION DETECTING DEVICE FOR DETECTING DIRECTION OF ROTATION

(75) Inventors: Katsuyoshi Shirai; Eiichiro Iwase; Nobuyasu Suzumura, all of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/138,577

(22) Filed: Aug. 24, 1998

(30) Foreign Application Priority Data

Aug. 25, 1997 (JP) .................................................. 9-228444

(51) Int. Cl.⁷ ............................... G01P 3/52; G01P 13/00
(52) U.S. Cl. .......................... 324/165; 324/166; 324/173; 324/207.25
(58) Field of Search .................... 324/165, 207.2–207.26, 324/166, 168, 173, 174, 175, 233; 338/32 R, 32 H

(56) References Cited

FOREIGN PATENT DOCUMENTS 25 18 054    11/1976  (DE) .
3318351   *  11/1994  (DE) .

* cited by examiner

*Primary Examiner*—Jay Patidar
(74) *Attorney, Agent, or Firm*—Sughrue, Mion, Zinn, Macpeak & Seas, PLLC

(57) ABSTRACT

A rotation detector (100) includes a first transmitting element (1) and a second transmitting element (3) each disposed opposite a gear rotor (5) attached to a rotating body as a detected member. A signal processing device (13) is connected to the first transmitting element and the second transmitting element for generating pulse signals based on rotation signals generated by the first transmitting element and the second transmitting element. The rotation detector is characterized in that the signal processing device generates the pulse signals with different pulse widths to distinguish between the case where the first transmitting element generates the rotation signal prior to the first transmitting element and the case where the second transmitting element generates the rotation signal prior to the first transmitting element.

1 Claim, 3 Drawing Sheets

POSITIVE ROTATION →

REVERSE ROTATION ←

WAVEFORM 1
(POSITIVE ROTATION)

WAVEFORM 2
(REVERSE ROTATION)

OUTPUT TIMING IN THE CASE OF POSITIVE ROTATION

FIRST MAGNETIC DETECTING ELEMENT

SECOND MAGNETIC DETECTING ELEMENT

THE CASE OF OUTPUT AT RISING AND FALLING OF THE FIRST MAGNETIC DETECTING ELEMENT

THE CASE OF OUTPUT AT RISING AND FALLING OF THE FIRST MAGNETIC DETECTING ELEMENT AND THE SECOND MAGNETIC DETECTING ELEMENT

ROTATION DETECTING DEVICE FOR DETECTING DIRECTION OF ROTATION

BACKGROUND OF THE INVENTION

1. Field of the Invention

The present invention relates to a rotation detector for detecting a rotation speed of a rotating body, which is used for a vehicle, an airplane, a machine tool, or the like.

2. Description of the Related Art

Japanese Patent Unexamined Publication No. Hei. 2-116753 discloses a conventional rotation detector. FIG. 4 of the publication showing the prior art discloses a rotation detecting device in which a pair of magnetic detecting elements are disposed in the vicinity of a magnetic substance rotating together with a rotating body, the respective magnetic detecting elements are connected through their respective signal processing circuits to a detecting circuit, and the rotation direction of the rotating body is detected by using phase differences of pulses generated by the pair of magnetic detecting elements.

In this rotation detecting device, the respective magnetic detecting elements are connected through the respective signal processing circuits to the detecting circuit so that the number of the required signal processing circuits is the same as that of the magnetic detecting elements. Further, the number of required signal detection lines from the detecting circuit is also the same. Thus, a circuit structure around the rotation detecting device becomes complicated.

In FIGS. 2 and 3 of the publication disclosing the prior art, there is disclosed a rotation detector in which a gear portion of a magnetic substance set on a rotating body is asymmetrically-shaped, and waveforms of signals generated are analyzed to detect the rotation direction of the rotating body.

However, in this prior art, since the magnetic substance must be machined asymmetrically, this detector has a problem in that the machining cost becomes high. Moreover, if the number of teeth is large, formation of the gear shape is difficult and a limitation occurs in resolution. Further, in the detecting circuit, two thresholds are required for determination of the rotation direction, so that the amplitude of an output signal must be wide.

SUMMARY OF THE INVENTION

An object of the present invention is to solve the foregoing shortcomings of the prior art.

In order to achieve the foregoing object, according to a first aspect of the present invention, a rotation detector comprises a first transmitting element and a second transmitting element each disposed opposite a gear rotor attached to a rotating body as a detected member and a signal processing device connected to the first transmitting element and the second transmitting element for generating pulse signals on the basis of rotation signals generated by the first transmitting element and the second transmitting element, wherein the rotation detector is characterized in that the signal processing device generates the pulse signals having different pulse widths in the case where the first transmitting element generates the rotation signal prior to the second transmitting element and in the case where the second transmitting element generates the rotation signal prior to the first transmitting element.

According to the rotation detector of the first aspect, since the pulse widths of the pulse signals generated by the signal processing device are made different in accordance with the rotation direction of the gear rotor attached to the rotating body as the detected member, the rotation direction of the rotating body can be detected by detecting the pulse widths of the pulse signals.

DETAILED DESCRIPTION OF THE INVENTION

The features of the present invention will be described below with reference to the drawings.

Figure 1:
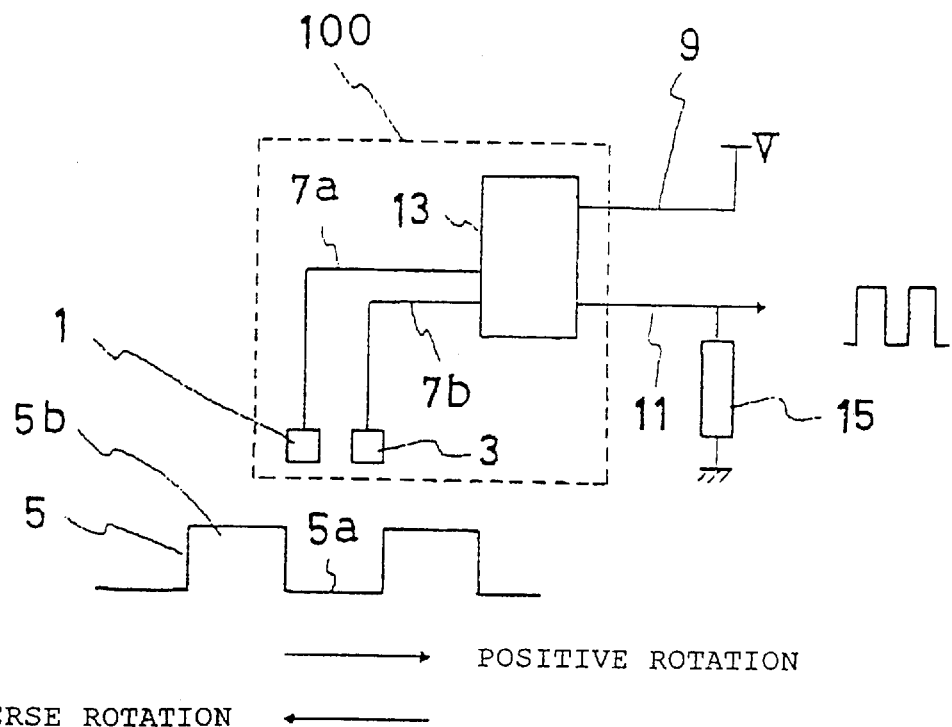
FIG. 1 is a block diagram showing a rotation detector of the present invention.

FIG. 1 is a block diagram showing a rotation detector 100 of the present invention. In the drawing, a first magnetic detecting element 1 and a second magnetic detecting element 3 are in parallel with each other and are disposed opposite a gear rotor 5 set on a not-shown rotating body as a detected member. For example, a Hall IC, an MRE (Magneto-Resistance Element) or the like is used for the magnetic detecting elements.

The gear rotor 5 is disc-shaped as a whole, and a recess 5a and a protrusion 5b are alternately disposed on its outer circumference portion. As shown in FIG. 1, it is assumed here that clockwise rotation in the drawing is positive rotation, and counter-clockwise rotation is reverse rotation. When the gear rotor 5 is rotated, the recess 5a and the protrusion 5b alternately approach the first magnetic detecting element 1 and the second magnetic detecting element 3, and the change of magnetic field generated by this is converted into electric signals by the first magnetic detecting element 1 and the second magnetic detecting element 3, respectively.

Figure 2:
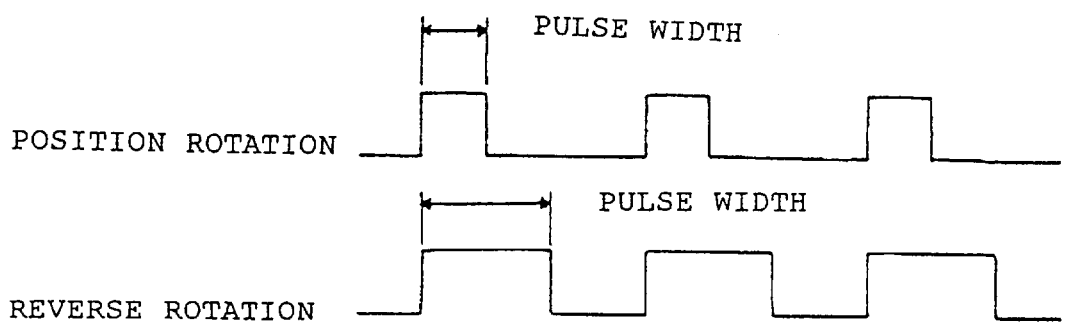
FIG. 2 is a view showing waveforms of pulse signals transmitted from a signal processing circuit of the rotation detector of the present invention.

A signal processing circuit 13 is connected to the first magnetic detecting element 1 and the second magnetic detecting element 3 through signal transmitting means 7a and 7b, respectively, and is also connected to a power source harness 9 and an output line 11. Based on signals generated by the first magnetic detecting element 1 and the second magnetic detecting element 3, the signal processing circuit judges the rotation direction of the rotating body, and transmits, for example, as shown in FIG. 2, pulse signals having pulse widths of length corresponding to the rotation direction through the output line 11 (FIG. 2). The output line 11 is grounded through a resistor 15.

Figure 3:
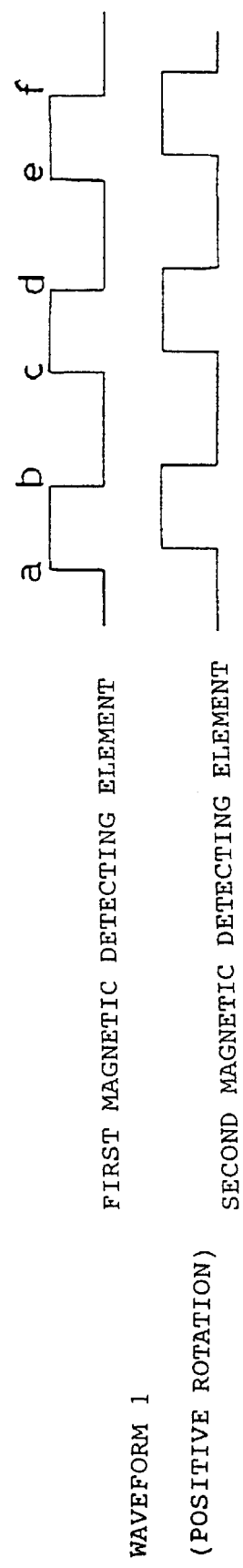
FIG. 3 is a view showing waveforms of electric signals generated by magnetic detecting elements of the rotation detector of the present invention when a gear rotor is in positive rotation.
Figure 4:
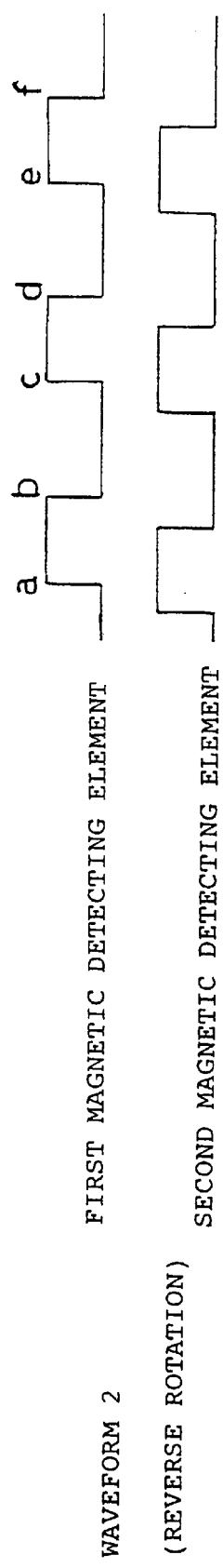
FIG. 4 is a view showing waveforms of electric signals generated by the magnetic detecting elements of the rotation detector of the present invention when the gear rotor is in reverse rotation.

An operation method of the rotation detector of the present invention will be described below with reference to FIGS. 3 and 4. FIGS. 3 and 4 show electric signals outputted from the first magnetic detecting element 1 and the second magnetic detecting element 3 to the signal lines 7a and 7b, respectively. FIG. 3 shows the electric signals when the gear rotor 5 is in positive rotation, and FIG. 4 shows the electric signals when the gear rotor 5 is in reverse rotation. The signal processing circuit 13, into which signals from the first magnetic detecting element 1 and the second magnetic detecting element 3 are inputted through the signal lines 7a and 7b, judges the rotation direction of the gear rotor 5 based on Table 1.

In FIG. 3, since the gear rotor 5 is in positive rotation, the signal of the second magnetic detecting element 3 is late with respect to the signal of the first magnetic detecting element 1 by a time corresponding to the interval between the first magnetic detecting element 1 and the second magnetic detecting element 3 the length of the outer circumference of the gear rotor 5 and the number of protrusions of the gear rotor 5. Here, attention is paid to the rising time of the signal of the first magnetic detecting element 1. According to Table 1, when the signal of the first magnetic detecting element 1 is changed such as L→ to H (point of time A, C, or E in FIG. 3), if the second magnetic detecting element 3 is in the L state, it is judged that the rotation is positive rotation.

Alternatively, attention is paid to the falling time of the signal of the first magnetic detecting element 1.

According to Table 1, when the signal of the first magnetic detecting element 1 is changed such as H→L (point of time B, D, or F in FIG. 3), if the second magnetic detecting element 3 is in the H state, it is judged that the rotation is positive rotation.

In FIG. 4, since the gear rotor 5 is in reverse rotation, the signal of the first magnetic detecting element 1 is late with respect to the signal of the second magnetic detecting element 3 by a time corresponding to the interval between the first magnetic detecting element 1 and the second magnetic detecting element 3, the length of the outer circumference of the gear rotor 5, and the number of protrusions of the gear rotor 5. Here, attention is paid to the rising time of the signal of the first magnetic detecting element 1. According to Table 1, when the signal of the first magnetic detecting element 1 is changed such as L→H (point of time "a", "c", or "e" in FIG. 4), if the second magnetic detecting element 3 is in the H state, it is judged that the rotation is reverse rotation.

TABLE 1

| State of signal of first magnetic detecting element | State of signal of second magnetic detecting element | Rotation direction |
| --- | --- | --- |
| L → H | L | Positive rotation |
| H → L | H | Positive rotation |
| L → H | H | Reverse rotation |
| H → L | L | Reverse rotation |

Alternatively, attention is paid to the falling time of the signal of the first magnetic detecting element 1. According to Table 1, when the signal of the first magnetic detecting element 1 is changed such as H→L (point of time "b", "d", or "f" in FIG. 4), if the second magnetic detecting element 3 is in the L state, it is judged that the rotation is reverse rotation.

The method of judging the rotation direction of the gear rotor 5 by the signal processing circuit 13 based on the signals from the first magnetic detecting element 1 and the second magnetic detecting element 3 is not limited to the foregoing method, but the judgement may be carried out according to Table 2 while paying attention to rising or falling of the signal of the second magnetic detecting element 3.

When the signal detecting circuit 13 judges that the gear rotor 5 is in the positive rotation on the basis of the signals of the first magnetic detecting element 1 and the second magnetic detecting element 3 as shown in the upper row of FIG. 2, the circuit transmits a pulse signal with a small pulse width to the output line 11. When the signal detecting circuit 13 judges that the gear rotor 5 is in the reverse rotation on the basis of the signals of the first magnetic detecting element 1 and the second magnetic detecting element 3, as shown in the lower row of FIG. 2, the circuit transmits a pulse signal with a pulse width larger than the case of the positive rotation to the output line 11.

TABLE 2

| State of signal of first magnetic detecting element | State of signal of second magnetic detecting element | Rotation direction |
| --- | --- | --- |
| H | L → H | Positive rotation |
| L | H → L | Positive rotation |
| L | L → H | Reverse rotation |
| H | H → L | Reverse rotation |

The pulse width of the pulse signal outputted from the signal detection circuit 13 to the output line 11 is not limited to the foregoing embodiment, but it is needless to say that when it is judged that the gear rotor 5 is in the positive rotation, the circuit may transmit to the output line 11 a pulse signal with a pulse width larger than the case of the reverse rotation.

A controller (not shown) may be connected to the output line 11, and the pulse width of the pulse signal outputted from the signal detecting circuit 13 to the output line 11 is detected, so that the rotation direction of the rotor is recognized.

Figure 5:
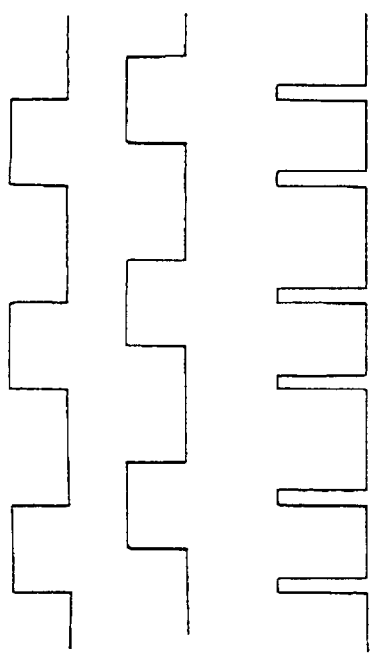
FIG. 5 is a view showing electric signals generated by the magnetic detecting elements and waveforms of pulse signals transmitted from the signal processing circuit of the rotation detector according to a modified embodiment of the present invention.

The rotation detector 100 of the present invention is not limited to the foregoing embodiment, but as shown in FIG. 5, it is also appropriate that the signal detecting circuit 13 transmits pulse signals with pulse widths corresponding to the rotation direction of the gear rotor 5 at each rising and falling of the signals of the first magnetic detecting element 1 (shown in the third row of FIG. 5).

Moreover, as shown in FIG. 5, it is also appropriate that the signal detecting circuit 13 transmits pulse signals with pulse widths corresponding to the rotation direction of the gear rotor 5 at each rising and falling edge of the signals of the first magnetic detecting element 1 (shown in the third row of FIG. 5) and the second magnetic detecting element 3 (shown in the lowermost row of FIG. 5).

As described above, according to the rotation detector of the present invention, since merely two lines of the power source harness and the output line are sufficient for electric wiring from the signal processing circuit, the rotation detector can be easily set in a vehicle, a machine, or the like, resulting in a low cost rotation detector.

Moreover, since the rotation direction of the rotating body is detected through the pulse width of the pulse signal transmitted from the signal processing circuit, only one threshold level at the side of a controller is sufficient, so that the circuit can be simplified.

Further, since the signal from the signal processing circuit becomes the L level upon stopping of the rotating body, current heat generation is small, and heat resistance of the circuit can be improved.

While the preferred embodiments have been described, variations thereto will occur to those skilled in the art within the scope of the present inventive concepts which are delineated by the following claims.

What is claimed is:

1. A rotation detector, comprising:

a first transmitting element and a second transmitting element each disposed opposite a gear rotor attached to a rotating body as a detected member; and a signal processing device connected to said first transmitting element and said second transmitting element for generating pulse signals based on rotation signals generated by said first transmitting element and said second transmitting element and transmitted to the signal processing device, wherein said signal processing device generates pulse signals with a first pulse width when said first transmitting element generates the rotation signal prior to said second transmitting element and generates pulse signals with a second pulse width greater than the first pulse width when the second transmitting element generates the rotation signal prior to said first transmitting element, whereby the signal processing device determines the rotational direction of the gear rotor by the order of the rotation signals generated by the first and second transmitting element and generates a pulse with different width depending on the rotational direction.

* * * * *